US012437526B2

(12) United States Patent
Pal et al.

(10) Patent No.: US 12,437,526 B2
(45) Date of Patent: Oct. 7, 2025

(54) METHODS AND SYSTEMS FOR AUTOMATED DISPLAY VERIFICATION

(71) Applicant: HONEYWELL INTERNATIONAL INC., Charlotte, NC (US)

(72) Inventors: Debabrata Pal, Bangalore (IN); Abhishek Alladi, Hyderabad (IN); Luke Zeleznak, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 510 days.

(21) Appl. No.: 17/817,860

(22) Filed: Aug. 5, 2022

(65) Prior Publication Data
US 2023/0419647 A1    Dec. 28, 2023

(30) Foreign Application Priority Data
Jun. 23, 2022  (IN) .............................. 202211036116

(51) Int. Cl.
*G06V 10/82*   (2022.01)
*G06N 20/10*   (2019.01)
(Continued)

(52) U.S. Cl.
CPC ............. *G06V 10/82* (2022.01); *G06N 20/10* (2019.01); *G06V 10/761* (2022.01); *G06V 10/7715* (2022.01); *G06V 10/776* (2022.01)

(58) Field of Classification Search
CPC .. G06V 10/82; G06V 10/761; G06V 10/7715; G06V 10/776; G06N 20/10; G06N 3/045; G06N 3/08
(Continued)

(56) References Cited

U.S. PATENT DOCUMENTS

| 7,454,060 B2 | 11/2008 | Fujiwara |
| 10,901,675 B2 | 1/2021 | True et al. |

(Continued)

FOREIGN PATENT DOCUMENTS

| CN | 110532886 A | 12/2019 |
| CN | 112232339 A | 1/2021 |

(Continued)

OTHER PUBLICATIONS

Koch, Gregory, et al., "Siamese Neural Networks for One-shot Image Recognition," Proceedings of the 32nd International Conference on Machine Learning, Lille, France, 2015. Jmlr: W&CP vol. 37, (2015).

(Continued)

*Primary Examiner* — Juan A Torres
(74) *Attorney, Agent, or Firm* — Ingrassia Fisher & Lorenz, LLP (57) ABSTRACT

Methods and systems are provided for automated validation of images generated by uncertified software. One method involves analyzing an unverified image and a reference image in parallel to identify sets of kernels associated with a layer of a convolutional neural network, creating a shared set of kernels associated with that layer in accordance with one or more kernel shortlisting criteria, obtaining a first feature map for the unverified image using that layer of the convolutional neural network and the shared set of kernels, obtaining a second feature map for the reference image using that layer of the convolutional neural network and the shared set of kernels, calculating a similarity score for the unverified image based at least in part on differences between the feature maps and a weighting factor associated with the first layer, and automatically validating the unverified image based at least in part on the similarity score.

20 Claims, 6 Drawing Sheets

(51) Int. Cl.
  *G06V 10/74* (2022.01)
  *G06V 10/77* (2022.01)
  *G06V 10/776* (2022.01)

(58) Field of Classification Search
  USPC .......................................................... 382/155
  See application file for complete search history.

(56) References Cited

U.S. PATENT DOCUMENTS

| | | | |
|---|---|---|---|
| 11,354,797 B2* | 6/2022 | Li | G06V 10/82 |
| 2007/0237394 A1 | 10/2007 | Fujiwara | |
| 2012/0194666 A1 | 8/2012 | Jackson | |
| 2019/0220746 A1 | 7/2019 | Liu et al. | |
| 2020/0394412 A1 | 12/2020 | Carreira et al. | |
| 2023/0073175 A1* | 3/2023 | Kim | G06N 3/0464 |

FOREIGN PATENT DOCUMENTS

| | | |
|---|---|---|
| CN | 112508041 A | 3/2021 |
| WO | 2017134519 A1 | 8/2017 |

OTHER PUBLICATIONS

Morel, Jean-Michel, et al., "ASIFT: A New Framework for Fully Affine Invariant Image Comparison," SIAM journal on imaging sciences 2, No. 2 (2009): 438-469, downloaded from http://www.cmap.polytechnique.fr/~yu/publications/ASIFT_SIIMS_final.pdf on Aug. 1, 2022, (2009).

Lamba, Harshall, "One Shot Learning with Siamese Networks Using Keras," Towards Data Science, Jan. 20, 19, downloaded from https://towardsdatascience.com/one-shot-learning-with-siamese-networks-using-keras-17f34e75bb3d on Aug. 2, 2022, (2019).

Saha, Sumit, "A Comprehensive Guide to Convolution Neural Networks—the ELI5 Way.", Towards Data Science, Dec. 15, 2018, downloaded from https://towardsdatascience.com/a-comprehensive-guide-to-convolutional-neural-networks-the-eli5-way-3bd2b1164a53 on Aug. 2, 2022, (2018).

Sung, Flood, et al. "Learning to Compare: Relation Network for Few-Shot Learning," arXiv:1711.06025v2 [cs.CV] Mar. 27, 2018, downloaded from https://arxiv.org/abs/1711.06025 on Aug. 5, 2022, (2018).

Snell, Jake, et al. "Prototypical Networks for Few-Shot Learning," arXiv:1703.05175v2 [cs.LG] Jun. 19, 2017, downloaded from https://arxiv.org/abs/1703.05175 on Aug. 5, 2022, (2017).

* cited by examiner

METHODS AND SYSTEMS FOR AUTOMATED DISPLAY VERIFICATION

CROSS REFERENCE TO RELATED APPLICATION

This application claims priority to Indian Provisional Patent Application No. 202211036116, filed Jun. 23, 2022, the entire content of which is incorporated by reference herein.

TECHNICAL FIELD

The subject matter described herein relates generally to vehicle systems, and more particularly, embodiments of the subject matter relate to verifying imagery or other graphical user interface (GUI) displays or elements generated by software for aircraft systems and related cockpit displays using.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the pilot can obtain information or perform functions related to, for example, navigation, flight planning, guidance and navigation, and performance management. Prior to deploying display software to an avionics system onboard an aircraft, one or more verification processes are typically performed to certify the display software by ensuring the imagery generated by the display software complies with applicable regulations or other requirements. For example, many avionics displays have standard symbology that provide situational information, such as altitude tape, airspeed indictor, flight path symbol, etc. However, the appearance and location of these standard symbols may differ based on type of aircraft and specifications allowed by regulatory authorities. Additionally, avionics display dimensions may vary in layout based on different Original Equipment Manufacturer (OEM) specifications.

In practice, a test engineer may be responsible for verifying the observed displays and graphics symbols contained therein that are generated by the display software by comparing the observed display behavior with the expected display behavior given the applicable requirements, regulations, OEM specifications and the like. However, given the robust regulatory requirements and different potential flight scenarios or pilot use cases, a manual testing and verification of display software can be time consuming and prone to human error, particularly as the complexity of the display increases, which can delay time to market even though the underlying display software is ready for deployment. For example, on any given image, it may be challenging to isolate and analyze the different features of interest (e.g., the layout of the symbology on the image) from insignificant features (e.g., actual values depicted for parameters that will vary during operation), particularly when the image includes multiple different layers, symbology with different levels of translucency, etc., such as a synthetic vision display with a constantly varying background. Accordingly, it is desirable to provide systems and methods to certify display software in an automated manner to reduce time to market while ensuring robustness and compliance with applicable requirements or regulations. Other desirable features and characteristics of the methods and systems will become apparent from the subsequent detailed description and the appended claims, taken in conjunction with the accompanying drawings and the preceding background.

BRIEF SUMMARY

Methods and systems are provided for automated validation of images generated by uncertified software, such as display software for an avionics system or other vehicle system. One method of automated validation of an unverified image involves analyzing the unverified image to identify a first plurality of kernels associated with a first layer of a convolutional neural network for the unverified image, analyzing a reference image to identify a second plurality of kernels associated with the first layer of the convolutional neural network for the reference image, creating a shared set of kernels associated with the first layer based at least in part on the first plurality of kernels and the second plurality of kernels in accordance with one or more kernel shortlisting criteria, obtaining a first feature map for the first layer of the unverified image using the first layer of the convolutional neural network and the shared set of kernels, obtaining a second feature map for the first layer of the reference image using the first layer of the convolutional neural network and the shared set of kernels, calculating a similarity score for the unverified image based at least in part on differences between the first feature map and the second feature map and a weighting factor associated with the first layer, and automatically validating the unverified image based at least in part on the similarity score.

In another embodiment, an apparatus is provided for a computer-readable medium having computer-executable instructions stored thereon that, when executed by a processing system, cause the processing system to analyze an unverified image using a first layer of a convolutional neural network to identify a first plurality of kernels associated with the first layer of the convolutional neural network for the unverified image, analyze a reference image using the first layer of the convolutional neural network to identify a second plurality of kernels associated with the first layer of the convolutional neural network for the reference image, create a shared set of kernels associated with the first layer based at least in part on the first plurality of kernels and the second plurality of kernels in accordance with one or more kernel shortlisting criteria, extract a first feature map for the first layer of the unverified image using the first layer of the convolutional neural network and the shared set of kernels, extract a second feature map for the first layer of the reference image using the first layer of the convolutional neural network and the shared set of kernels, calculate a similarity score for the unverified image based at least in part on differences between the first feature map and the second feature map and a weighting factor associated with the first layer, and automatically validate the unverified image based at least in part on the similarity score.

In another embodiment, an apparatus for a computing device is provided that includes at least one computer-readable storage medium to store computer-executable instructions and at least one processor, coupled to the at least one computer-readable storage medium, to execute the computer-executable instructions. The execution of the computer-executable instructions cause the at least one processor to analyze an unverified image using a first layer of a convolutional neural network to identify a first plurality of kernels associated with the first layer of the convolutional neural network for the unverified image, analyze a reference image using the first layer of the convolutional neural network to identify a second plurality of kernels associated with the first layer of the convolutional neural network for the reference image, create a shared set of kernels associated with the first layer based at least in part on the first plurality of kernels and the second plurality of kernels in accordance with one or more kernel shortlisting criteria, extract a first feature map for the first layer of the unverified image using the first layer of the convolutional neural network and the shared set of kernels, extract a second feature map for the first layer of the reference image using the first layer of the convolutional neural network and the shared set of kernels, calculate a similarity score for the unverified image based at least in part on differences between the first feature map and the second feature map and a weighting factor associated with the first layer, and automatically validate the unverified image based at least in part on the similarity score.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods that automate software verification by verifying graphical user interface (GUI) displays or other symbology generated by the software has a geometrical structure that matches or is otherwise substantially similar to the geometrical structure of validated GUI displays and/or elements using a Siamese network configuration of a convolutional neural network (CNN) where an unverified image under test and a reference image are analyzed in parallel via common layers of a common CNN. In exemplary embodiments, at each common parallel layer of the common CNN, kernel shortlisting is employed to augment kernels to emphasize feature patterns (or deemphasize non-pattern features) in accordance with shortlisting criteria to arrive at a shared set of kernels associated with a respective layer of the CNN used to extract feature maps for both input images in parallel. The extracted feature maps are then utilized for layer-wise feature matching and joint similarity determination across layers of the CNN. For purposes of explanation, the subject matter may be primarily described herein in the context of displays associated with an avionics system onboard an aircraft, such as, for example, a primary flight display (PFD), a synthetic vision system (SVS) display or other navigational map or forward-looking perspective view display where different types of symbology may be rendered in one or more graphical layers overlying a variable background. That said, it will be appreciated that the subject matter described herein is not necessarily limited to aircraft or avionic environments, and in practice, may be implemented in the context of any sort of computer system or in the context of other types of vehicles and travel spaces (e.g., automobiles or ground operations, vessels or marine operations, etc.).

In displays where different types of symbology are rendered overlying a variable background, such as a PFD, a SVS display, or the like, it is challenging for a human or other image processing software to compare significant GUI elements or other graphical components or symbology without considering the underlying background, which may vary between any pair of images. Additionally, different displays may have different dimensions, which increases the challenge when attempting to identify any missing, noncompliant or otherwise anomalous graphical components or symbology generated by new, uncertified display software by comparing images to different display software that may have been previously certified, albeit with displays having different dimensions. Accordingly, the subject matter described herein automates the comparison and verification of the actual, unverified images generated by new or uncertified display software with reference to reference images expected to be generated by certified display software or otherwise verified as complying with applicable regulations or other requirements in a manner that isolates or otherwise focuses on relevant symbology or graphical components rather than underlying background features that may be insignificant or otherwise not of interest for purposes of software verification. The automated verification processes described herein provide an output indicia of whether the unverified images generated by new or uncertified display software pass or fail based on relative similarity between the actual images and the expected images without requiring any human in the loop or other manual intervention, thereby mitigating potential human error and reducing the time required to certify display software.

As described in greater detail below, in exemplary embodiments, optical character recognition (OCR) is performed to recognize text or other character values contained within images and remove character pixels from the both the unverified and expected reference images before performing any comparisons, for example, by substituting character pixel values with values corresponding to the surrounding or adjacent background pixels. In this manner, text or other character values which may be insignificant so as to not generate false negatives or otherwise create a hindrance with respect to learning generalized features of the layout or structure of the image. Thereafter, both the unverified image and the corresponding expected reference image are passed through instances of the same CNN in a Siamese network configuration to extract relevant feature maps from the respective images used to assess the similarity between the symbology, layout or other geometric features of the images with variable backgrounds using a one-shot learning approach.

Conventional CNN filters learn parameters like weights and biases which are floating in numeric value. Since an image is composed of texture, shadow and other effects, there exists multiple gray level variations, which causes a kernel to learn abrupt varying pixel values across its matrix dimension. Accordingly, in implementations described herein, kernel shortlisting criteria are utilized to help the CNN learning-based model to develop a feature extraction layer which is sensitive to only key features of constant gray levels and regular geometry, thereby suppressing variable background terrain data and the like. For example, as described in greater detail below, kernels learned by the CNN for a given layer are constrained to retain corresponding element values when it contains substantially the same values consecutively across a dimension of the respective kernel matrix, and otherwise, kernel values are replaced with a negligible value (e.g., zero or another de minimis value) to avoid vanishing gradient and rendering any kernels lacking the same values across a dimension of the respective kernel matrix a non-contributing kernel for present epoch or iteration of the CNN since it does not contribute to learn a generalized feature of a layout object having same intensity level.

Once feature map vectors are extracted from both the unverified and expected reference images for the different layers of the CNN, the feature map vector differences are calculated on a per layer basis to arrive at a respective similarity score for each layer of the CNN. For example, the lower layers of the CNN may extract edges or other constituent geometric features that represent the discrete graphical elements or pieces that combine to make up the symbology, layout or other higher level geometric graphical structures contained within an image, while the higher layers of the CNN extract more of the overall symbology, layout or geometric graphical structures of the image in their entirety. A joint similarity score comparing the images across all layers is calculated or otherwise determined as a weighted sum of the similarity scores for the respective layers of the CNN, where the weighting factors associated with the respective layers of the CNN progressively decrease from the lowest layer of the CNN to the highest layer of the CNN. In this manner, the weighting factors reduce the influence of the higher level features of the images (e.g., the variable background features) and allow the joint similarity score to provide a better or more reliable indication of the similarity of the images with respect to the symbology, graphical components, layout or other structural or geometric features of the images that are rendered or otherwise layered over the top of the background. When the joint similarity score is greater than a threshold value that indicates a desired level of similarity between a respective unverified image and a corresponding expected reference image, the respective unverified image may be tagged, marked or otherwise designated as validated, verified or certified as compliant with applicable regulatory requirements or other specifications. Accordingly, once a desired number and type of unverified images resulting from one or more different test cases with respect to the uncertified display software have been obtained and validated against corresponding expected reference images, the uncertified display software may be similarly tagged, marked or otherwise designated as validated, verified or certified as compliant with applicable regulatory requirements or other specifications, thereby allowing the display software to be deployed (e.g., to avionics systems onboard an aircraft).

Figure 1:
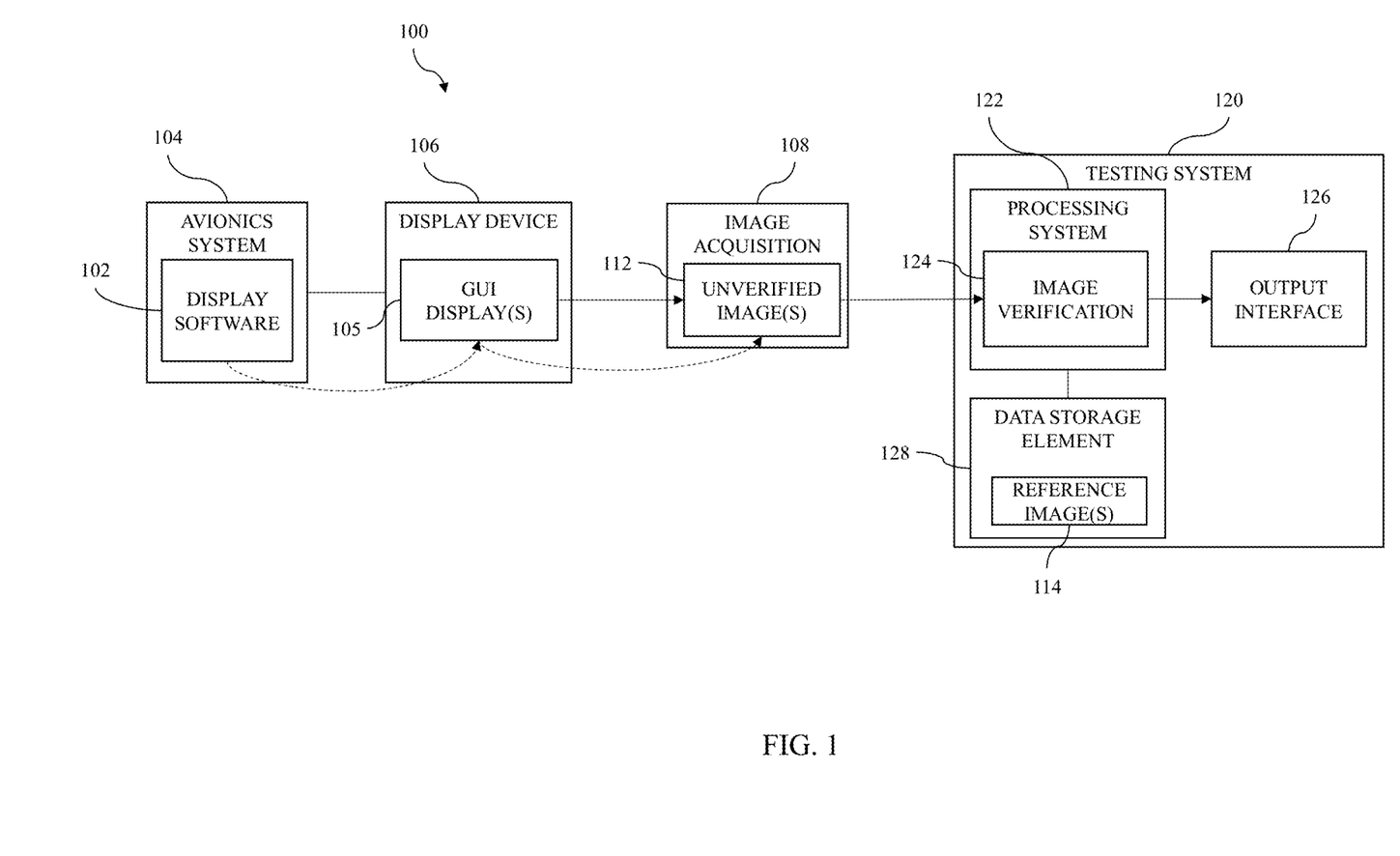
FIG. 1 is a block diagram illustrating a system including a testing system for automated validation of graphical user interface (GUI) displays generated by an instance of software associated with a vehicle onboard system such as an avionics system in accordance with one or more exemplary embodiments.

FIG. 1 depicts an exemplary embodiment of a system 100 for verifying an instance of software 102 that includes computer-readable instructions that are executable by any sort of device or computing system 104 that includes or is otherwise coupled to a display device 106, where the software 102 is configurable to cause the system 104 render or otherwise generate one or more GUI displays 105 or other imagery on the display device 106 when executed. For purposes of explanation, the subject matter may be described herein in the context of the software 102 being executed by one or more processors, controllers or other processing systems that reside on or at an avionics system 104, and the software 102 may alternatively be referred to herein as display software. Depending on the embodiment, the display software 102 may be realized as a standalone software application program to be installed or otherwise executed on the avionics system 104 or a software update to be incorporated with existing software at the avionics system 104. That said, it should be appreciated that the subject matter described herein is not limited to any particular type or configuration of software under test, and moreover, is not limited to avionics systems or any other particular type or configuration of hardware executing the software under test. In this regard, FIG. 1 depicts a simplified representation of the system 100 for purposes of explanation and is not intended to be limiting. For example, in some embodiments, the display device 106 may be integrated or otherwise incorporated with the avionics system 104.

In exemplary embodiments, the display device 106 is realized as any sort of electronic display capable of graphically displaying information or data associated with operation of an aircraft under control of the avionics system 104. The avionics system 104 may be realized as any sort of avionics system, such as, for example, a display system, a flight management system (FMS), a synthetic vision system (SVS), a multifunction control and display unit (MCDU), a navigation system, a communications system, a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

The avionics system 104 executing the display software 102 under test generally includes at least one processing system, which may include or otherwise be realized using at least one or more of a general purpose processor, a content addressable memory, a digital signal processor, an application specific integrated circuit, a field programmable gate array, any suitable programmable logic device, discrete gate or transistor logic, a processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof. The avionics system 104 also includes or otherwise accesses a data storage element (or memory), which may be realized as any sort of non-transitory short or long term storage media capable of storing programming instructions corresponding to the display software 102 for execution by the processing system of the avionics system 104. In this regard, the code or other computer-executable programming instructions associated with the display software 102, when read and executed by the processing system at the avionics system 104, cause the avionics system 104 to render, generate or otherwise display imagery associated with the display software 102 on the display device 106.

Still referring to FIG. 1, the system 100 includes an image acquisition module 108 that is configured to capture unverified images 112 corresponding to different states of the GUI display(s) 105 generated by the display software 102 on the display device 106 for subsequent verification or validation at a testing system 120. In some embodiments, the image acquisition module 108 is realized as a frame grabber or other electronic device or dedicated hardware configured to capture individual, digital still image frames (or images) from the video signal or stream that is input to the display device 106. In other embodiments, the image acquisition module 108 may be realized using software, such as a screenshot capturing utility installed at the avionics system 104 and/or the display device 106. In yet other embodiments, the image acquisition module 108 may include a camera or similar image capturing device capable of capturing individual images corresponding to the state of the GUI display(s) on the display device 106.

A testing system 120 is coupled to the image acquisition module 108 to receive, from the image acquisition module 108 via any sort of wired interface, wireless interface, communications network or the like, the one or more unverified images 112 generated by the display software 102 for analysis and comparison with corresponding reference image(s) 114. In this regard, the reference images 114 represent the expected imagery to be generated by the display software 102 in order to comply with applicable regulatory requirements or other specifications required for certifying the display software 102 for subsequent deployment (e.g., to other instances of avionics systems 104 onboard other aircraft). In practice, the reference images 114 may have been previously generated by an instance of the display software 102 and manually verified as compliant with applicable regulatory requirements.

The testing system 120 includes a processing system 122 configurable to support an image verification service 124 (or application) that compares the unverified image(s) 112 received from the image acquisition module 108 with the corresponding reference image(s) 114 to verify the unverified image(s) 112 and the reference image(s) 114 are substantially similar or otherwise match with at least a desired level of similarity. As described in greater detail below, the image verification service 124 provides indicia of whether or not the display software 102 complies with the applicable requirements for verification via an output interface 126, which may include or otherwise be realized using any sort of device capable of providing an output for a human user or other computing device (e.g., a display device, an audio output device, a transmitter or other communications interface, and/or the like).

Depending on the embodiment, the processing system 122 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 122 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 122 includes processing logic that may be configured to carry out the functions, techniques, and processing tasks associated with the operation of the testing system 120, as described in greater detail below. Furthermore, the steps of a method or algorithm described in connection with the embodiments disclosed herein may be embodied directly in hardware, in firmware, in a software module executed by the processing system 122, or in any practical combination thereof.

In exemplary embodiments, the testing system 120 includes or otherwise accesses a data storage element 128 (or memory), which may be realized as any sort of non-transitory short or long term storage media capable of storing the reference image(s) 114 for comparison along with the computer-readable programming instructions associated with the image verification service 124 for execution by the processing system 122. In this regard, the code or other computer-executable programming instructions, when read and executed by the processing system 122, cause the processing system 122 to generate the image verification service 124 and support or otherwise perform certain tasks, operations, functions, and/or processes described herein.

Figure 2:
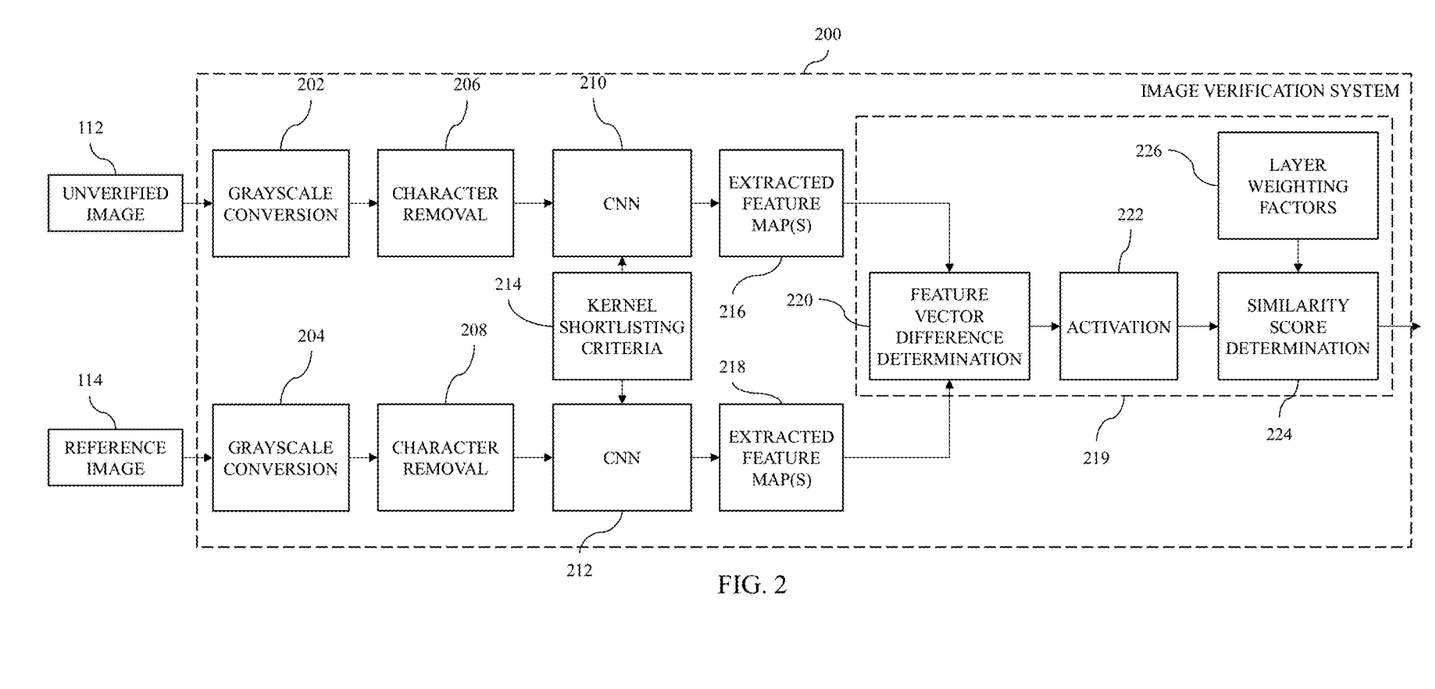
FIG. 2 is a block diagram illustrating an image verification system suitable for use as the image verification service at the testing system in the system of FIG. 1 in accordance with one or more exemplary embodiments.

FIG. 2 depicts an exemplary embodiment of an image verification system 200 suitable for implementation by the image verification service 124 of the testing system 120 in the system 100 of FIG. 1. As described above in the context of FIG. 1, the image verification system 200 receives an unverified image 112 generated by uncertified display software 102 and compares the unverified image 112 to an expected reference image 114 and generates an output indication of whether or not the unverified image 112 matches the expected reference image 114 with a desired level of similarity. The image verification system 200 is configured as a Siamese network with one-shot learning where both images 112, 114 are analyzed in parallel to determine similarity between the images 112, 114, as described in greater detail below. In some implementations, the image verification system 200 is configurable to allow a user to define only a portion or subregion of the images 112, 114 for comparison, for example, by manipulating a user input device associated with the testing system 120 to configure the image verification service 124 to crop the images 112, 114 to compare a particular region of interest.

In the illustrated implementation depicted in FIG. 1, both images 112, 114 (or the designated cropped portions thereof) are input or otherwise provided to grayscale conversion process 202, 204 that converts the images to grayscale to reduce color channel dynamics. In this regard, symbology and/or graphical components related to the layout of a GUI display such as edges, circles, lines or the like will remain consistent with grayscale values given an individual or combination of multiple solid colors may be used to define those graphical features while generalizing those graphical features to deemphasize variations in coloration when matching similar symbology with similar layout or structure where color variations are insignificant.

In exemplary embodiments, the grayscale versions of the images 112, 114 output by the grayscale conversion process 202, 204 are output or otherwise provided as input to a character removal process 206, 208 that is configurable to perform optical character recognition (OCR) to detect or otherwise recognize alphanumeric characters or other text in the images 112, 114 and remove the detected characters or text by substituting background or adjacent pixel values for the character pixel values. In one or more implementations, a multimodal histogram of pixel values is utilized to identify or otherwise determine the dominant character pixel value and the dominant background pixel value, for example, based on the location of the peak pixel values on the histogram of pixel values. To differentiate and identify the character pixel values, the character removal process 206, 208 analyzes the dimensions or widths of the graphical features associated with a respective pixel value from among the dominant pixel values and automatically identifies as character pixel values those dominant pixel values where the associated graphical features have substantially constant or consistent dimensions, while the dominant pixel value having graphical features of variable dimensions is identified as the background pixel value. Thereafter, the character removal process 206, 208 automatically substitute the background pixel value for the character pixel values within the images 112, 114.

Still referring to FIG. 2, after grayscale conversion and character removal, the versions of the images 112, 114 output by the character removal process 206, 208 are provided as input to parallel layers 210, 212 of a common convolutional neural network (CNN) that is configured as a Siamese network and utilizes one or more kernel shortlisting criteria 214 to create a shared set of kernels associated with each respective layer of the CNN to extract feature maps 216, 218 for the respective images 112, 114 corresponding to the respective layers of the CNN using the shared set of kernels associated with the respective layer of the CNN. In this regard, it should be appreciated that although FIG. 2 depicts two instances of parallel CNN layers 210, 212 for purposes of explanation and illustration of the parallel processing, that in practice, the parallel CNN layers 210, 212 may be implemented or otherwise realized as a common CNN layer of a common CNN. The CNN generally includes, for each CNN layer 210, 212, a convolutional phase using an appropriately sized convolutional filter that produces a set of kernels corresponding to smaller tiles of the input images 112, 114 in a manner translationally invariant so that features of interest can be identified regardless of their location within the respective input image 112, 114. In exemplary embodiments, one or more kernel shortlisting criteria 214 are utilized to produce shared set of kernels associated with each respective CNN layer 210, 212 that are shared across the parallel CNN layer 210, 212 in the Siamese network configuration to extract feature maps 216, 218 for the respective CNN layer 210, 212 in parallel using the shared set of kernels.

The extracted feature maps 216, 218 for each respective CNN layer 210, 212 are provided to a classification stage 219 of the Siamese network. The classification stage 219 includes a feature vector difference determination process 220 that determines the difference (or distances) between extracted feature maps 216, 218 for each respective CNN layer 210, 212. The output of the feature vector determination process 220 is a set of vectors that represent the difference between the extracted feature maps 216, 218 at each respective CNN layer 210, 212, which are then passed to an activation function 222 before a similarity score determination process 224 that calculates or otherwise determines a joint similarity score for the relationship between the unverified image 112 and the reference image 114 as a function of the feature difference vectors, for example, as a weighted sum of the respective similarity scores associated with each respective CNN layer 210, 212 using different layer weighting factors 226. When the joint similarity score is greater than a threshold value that indicates that the images 112, 114 are substantially similar, the similarity score determination process 224 outputs or otherwise provides indication that the unverified image 112 that was input to the image verification system 200 has been validated or otherwise verified as matching the expected image 114 with a desired level of similarity. For example, in one implementation, the image verification system 200 mark or otherwise tag the previously unverified image 112 with metadata that indicates that the image 112 has been validated or verified. On the other hand, when the joint similarity score is less than the threshold value, the similarity score determination process 224 outputs or otherwise provides indication that the unverified image 112 that was input to the image verification system 200 is invalid or anomalous, for example, by marking or otherwise tagging the previously unverified image 112 with metadata that indicates that the image 112 has been invalidated or is otherwise anomalous.

Referring to FIGS. 1-2, in one or more implementations, the image verification service 124, 200 is configurable to receive or otherwise analyze multiple different images 112 associated with the display software 102 and automatically validate or otherwise verify the display software 102 based on the joint similarity determinations across the different images 112. For example, when at least a threshold number or a threshold percentage of unverified images 112 associated with the display software 102 have been determined to match the corresponding reference images 114 with the desired degree of similarity, the image verification service 124, 200 may output or otherwise provide an indication, via the output interface 126, that the display software 102 has been automatically verified and is ready for deployment or subsequent analysis (e.g., manual verification or certification). On the other hand, when fewer than another threshold number or threshold percentage of unverified images 112 associated with the display software 102 fail to match the corresponding reference images 114, the image verification service 124, 200 may output or otherwise provide an indication, via the output interface 126, that the display software 102 cannot be verified or does not comply with applicable requirements, thereby notifying the developer(s) associated with the display software 102 that the display software 102 requires alteration or modification before it can be verified and deployed.

Figure 3:
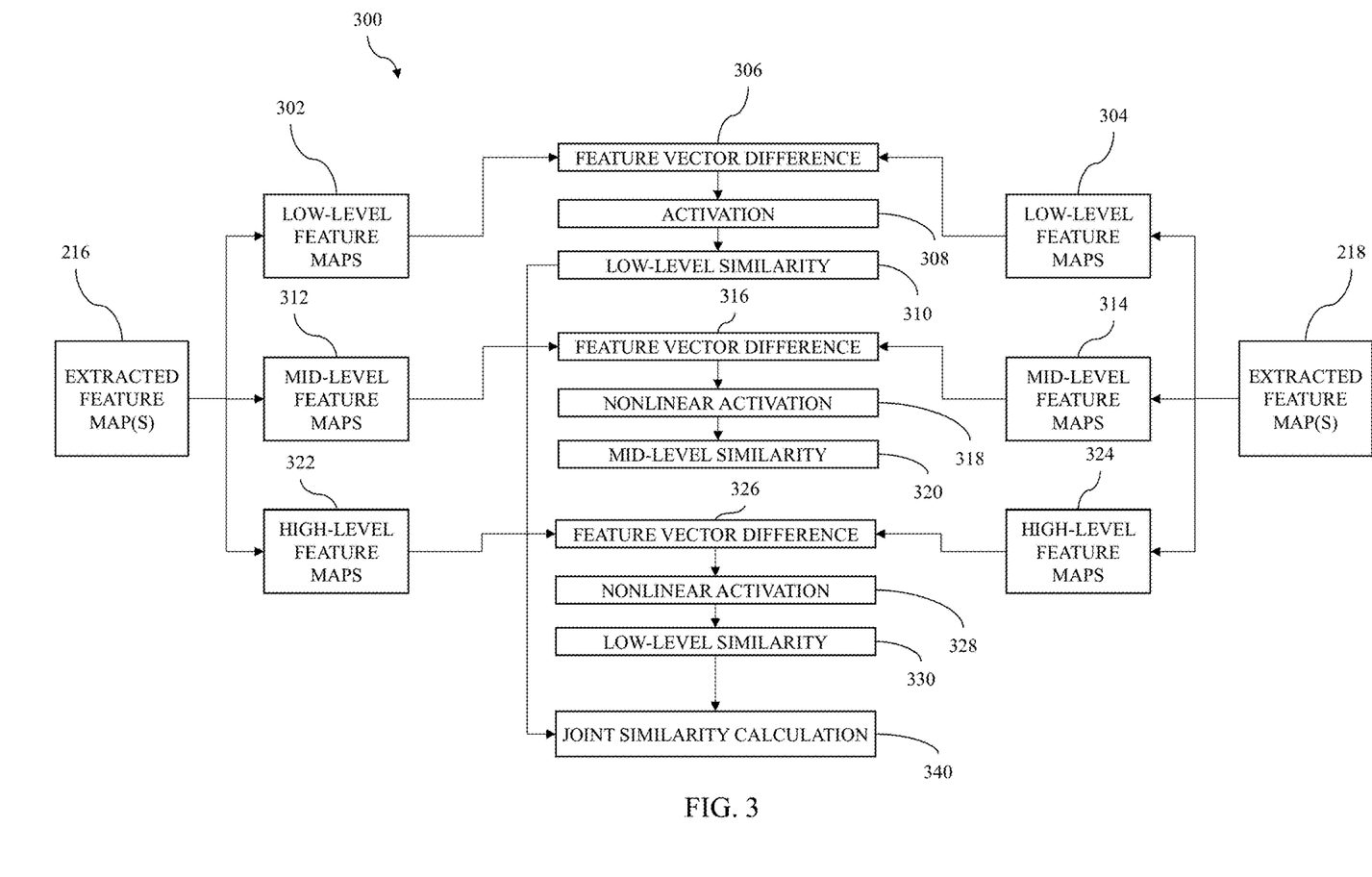
FIG. 3 is a block diagram illustrating an exemplary classification stage suitable for use with the image verification system of FIG. 2 in accordance with one or more exemplary embodiments.

FIG. 3 depicts an exemplary implementation of a classification stage 300 suitable for use as the classification stage 219 in the Siamese network of the image verification system 200. In this regard, FIG. 3 depicts an implementation where the extracted feature maps 216 for the unverified image 112 are divided into a set of lower level feature maps 302, a set of intermediate level (or mid-level) feature maps 312, and a set of higher level feature maps 322, and the extracted feature maps 218 for the reference image 114 are similarly divided into low-level feature maps 304, mid-level feature maps 314, and high-level feature maps 324. The sets of low-level feature maps 302, 304 are provided to a feature vector difference determination process 306 that computes the absolute difference between the feature maps 312, 314 associated with the respective layers of the CNN to be provided to a nonlinear activation unit 308 (e.g., a sigmoid function) before being input to a low-level similarity score determination process 310. The low-level similarity score (LS) may be represented by the equation:

$$LS = \sum_{i=1,j=1}^{n,n-i} similarity(UIFM_{Low}[i], RIFM_{Low}[j]),$$

where $UIFM_{Low}[i]$ represents the low-level feature maps associated with the unverified image (e.g., extracted feature maps 216, 302), $RIFM_{Low}[i]$ represents the low-level feature maps associated with the reference image (e.g., extracted feature maps 218, 304), n represents the total number of low-level feature maps available, and i and j represent indexes for the respective feature maps. Similarly, the sets of mid-level and high-level feature maps 312, 314, 322, 324 are provided to corresponding feature vector difference determination processes 316, 326 that compute the feature difference vectors associated with the respective layers of the CNN to be provided to corresponding nonlinear activation units 318, 328 before being input to respective similarity score determination processes 320, 330. In a similar manner, the mid-level similarity score (MS) may be represented by the equation $$MS = \sum_{i=1,j=1}^{n,n-i} similarity(UIFM_{Mid}[i], RIFM_{Mid}[j]),$$

and the high-level similarity score (HS) may be represented by the equation $$HS = \sum_{i=1,j=1}^{n,n-i} similarity(UIFM_{High}[i], RIFM_{High}[j]).$$

The respective similarity scores determined by the different score determination processes, 310, 320, 330 associated with the different CNN layers 210, 212 are provided to a joint similarity score determination process 340 that calculates or otherwise determines a joint similarity score as a function of the layer-wise similarity scores using different layer weighting factors 226. In exemplary embodiments, the joint similarity score (JS) is governed by the equation $JS=\alpha LS+\beta MS+\gamma HS$, where $\alpha$, $\beta$ and $\gamma$ represent the weighting factors 226 associated with the respective CNN layers 210, 212, where $\alpha>\beta>\gamma$ and $\alpha+\beta+\gamma=1$ to increasingly weight the similarity of the lower level features of the images 112, 114 that are more relevant to the similarity of the symbology, layout or other geometric or structural features of the images 112, 114 relative to the high level features of the images 112, 114 which may be more attributable to the background or other aspects of less significance. In exemplary embodiments, the weighting factors are optimized in accordance with the expectation max maximization over parameters represented by $equation_{(\alpha, \beta, \gamma)}^{argmax} JS (\alpha, \beta, \gamma)$ using a training data set of pairs of images 112, 114, thereby allowing the Siamese network configuration depicted in FIGS. 2-3 to subsequently function as a one-shot-learning model effectively trained using one reference image 114 for each unverified image 112. Although FIG. 3 depicts an exemplary classification stage 300 including only three CNN layers (or 3 levels of different groups of CNN layers), in practice, the preceding CNN layers 210, 212 and the classification stages 219, 300 are not limited to any particular number of layers or levels.

In exemplary embodiments, the nonlinear activation functions 308, 318, 328 (e.g., activation function 222) are realized using a sigmoid function such that a resulting value or label of "1" output by the activation function 308, 318, 328 indicates that the images 112, 114 match or otherwise correspond to the same class, while a value or label of "0" output by the activation function 308, 318, 328 indicates that the images 112, 114 match or otherwise correspond to a different class. In this regard, when the joint similarity score is greater than a threshold value (e.g., 0.95) or otherwise substantially equal to 1, the classification stage 300 validates or otherwise confirms the unverified image 112 as having symbology, layout or other geometric features that match the reference image 114 with at least a desired level of similarity. Otherwise, when the joint similarity score is less than the threshold value, the classification stage 300 fails to validate the unverified image 112 as having the required symbology, layout or other geometric features associated with the expected reference image 114 that satisfies the applicable requirements.

Figure 4:
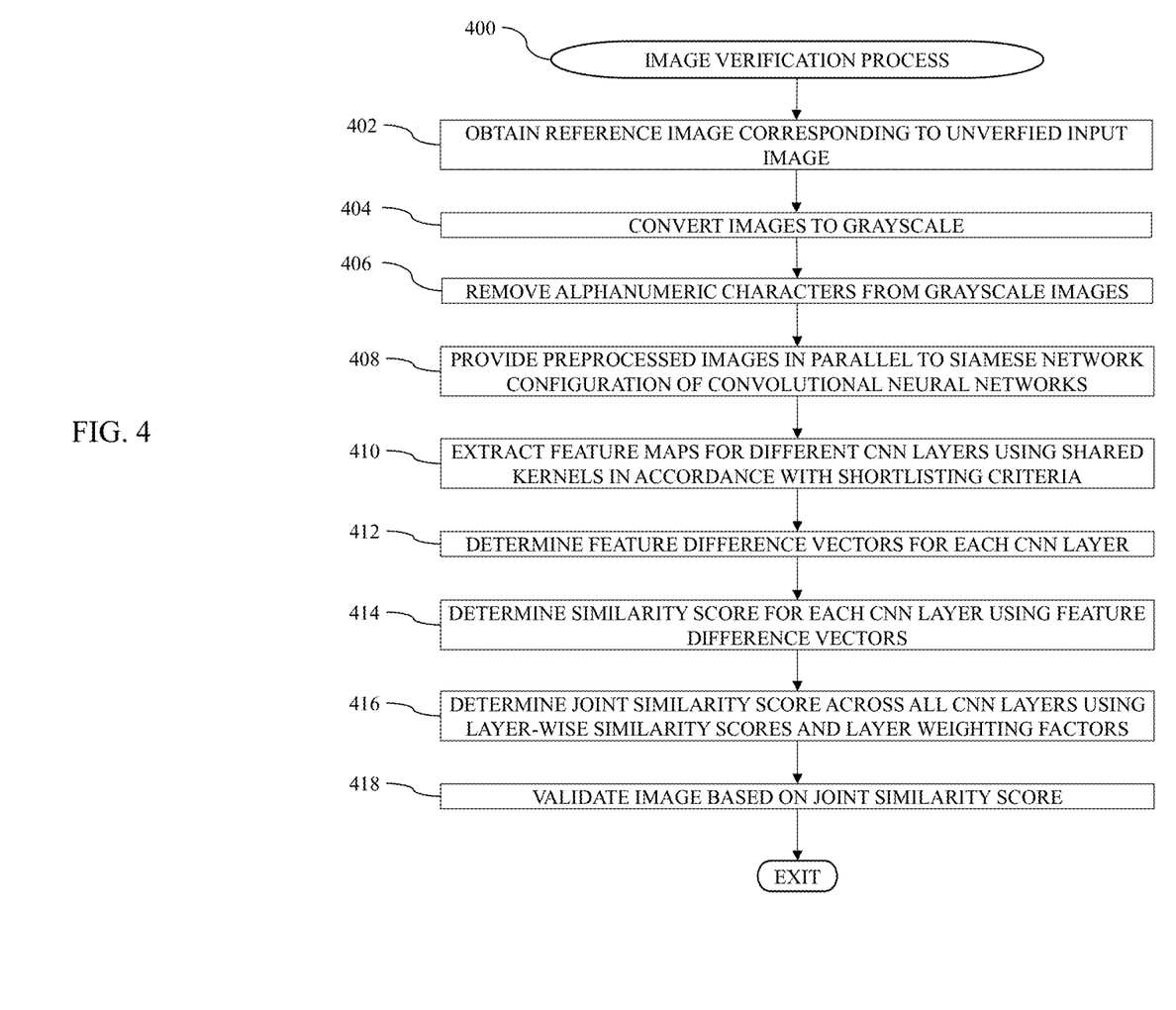
FIG. 4 is a flow diagram illustrating an image verification process suitable for implementation by the image verification service in the system of FIG. 1 in accordance with one or more exemplary embodiments.

FIG. 4 depicts an exemplary embodiment of an image verification process 400 suitable for implementation by a testing system to automatically validate an unverified input image under test includes symbology, graphical layout and/or other graphical components or geometric structures that comply with applicable requirements by matching the unverified input image to a verified reference image. The various tasks performed in connection with the image verification process 400 may be implemented using hardware, firmware, software executed by processing circuitry, or any combination thereof. For illustrative purposes, the following description may refer to elements mentioned above in connection with FIGS. 1-3. In practice, portions of the image verification process 400 may be performed by different elements of the systems 100, 200; however, for purposes of explanation, the image verification process 400 may be described herein primarily in the context of being implemented by the image verification service 124 and/or the image verification system 200. It should be appreciated that the image verification process 400 may include any number of additional or alternative tasks, the tasks need not be performed in the illustrated order and/or the tasks may be performed concurrently, and/or the image verification process 400 may be incorporated into a more comprehensive procedure or process having additional functionality not described in detail herein. Moreover, one or more of the tasks shown and described in the context of FIG. 4 could be omitted from a practical embodiment of the image verification process 400 as long as the intended overall functionality remains intact.

In the illustrated embodiment, the image verification process 400 is automatically initiated in response to a testing system receiving one or more unverified input images from an image acquisition module corresponding to an instance of display software under test. In this regard, the image verification process 400 begins by identifying or otherwise obtaining a reference image corresponding to an unverified input image under test (task 402). For example, referring to FIG. 1, in response to the image acquisition module 108 submitting an unverified image 112 to the image verification service 124 at the testing system 120, the image verification service 124 may utilize information associated with the unverified image 112 to identify and obtain the appropriate reference image 114 for comparison from the data storage element 128. For example, the reference images 114 may be tagged or otherwise stored in association with one or more identifiers or other metadata that indicate one or more of the property or characteristics of object under test in the respective reference image, the test scenario to be tested using the respective reference image and/or the expected behavior based on a scenario. In one implementation, the image acquisition module 108 may provide indicia of the type of avionics system 104 and/or the GUI display 105 that the unverified image 112 is associated with and/or contextual information indicative of the current or simulated operating state associated with the aircraft at the time of the capture of the unverified image 112 (e.g., the flight phase, flight control mode, the aircraft configuration, and/or the like), which, in turn, maybe utilized by the image verification service 124 to identify the appropriate reference image 114 from the data storage element 128 that corresponds to the expected behavior for that particular avionics system 104 and/or GUI display 105 given the operational context. In this regard, the reference image 114 effectively corresponds to a ground truth image that has been manually verified as having the graphical layout that is expected to be rendered or depicted by or on the respective avionics system 104 and/or the GUI display 105 and the identified reference image 114 includes the symbology or other graphical components and geometric structure that is required for presentation on or within the particular GUI display 105 captured by the image acquisition module 108.

Still referring to FIG. 4 with continued reference to FIGS. 1-3, after obtaining the appropriate reference image, the image verification process 400 transforms or otherwise converts the pixels of the reference image and the unverified image under test from color values to corresponding grayscale values (task 404). As described above, both the unverified image 112 and the reference image 114 are provided to a grayscale conversion process 202, 204 in parallel to convert each individual pixel value from an RGB color model value or other colored representation into a corresponding grayscale value to deemphasize variations in color. After grayscale conversion, the image verification process 400 analyzes the images to detect and remove alphanumeric characters from the grayscale versions of the images (task 406). For example, as described above, character removal processes 206, 208 utilize OCR techniques to detect or otherwise recognize alphanumeric characters or other text in the images 112, 114, and then substitute the background or adjacent pixel values for the character pixel values. In this manner, the lower level analysis associated with comparing the images 112, 114 is not influenced by variations in color or alphanumerical characters contained therein, such that the resulting comparisons reflect differences or similarities between the symbology, layout or other geometric structures or graphical components.

After grayscale conversion and character removal, the image verification process 400 continues by inputting or otherwise providing the preprocessed versions of the unverified image under test and the reference image to a Siamese network configuration of a CNN to extract or otherwise determine feature maps for the different CNN layers of the Siamese network configuration using shared kernels across each layer of the CNN (tasks 408, 410). To create the shared set of kernels associated with a given layer of the CNN, kernel shortlisting criteria are implemented using logic rules associated with each neuron within each respective layer of the CNN. For example, a first CNN layer 210 may analyze the unverified image 112 to derive a first set of kernels associated with the first CNN layer 210 for the unverified image 112, while the reference image 114 is analyzed in parallel via the corresponding or common CNN layer 212 to derive a second set of kernels associated with the first CNN layer 212 for the reference image 114. If-else logic is then applied to each of the kernels to augment the kernels in accordance with the kernel shortlisting criteria to arrive at a set of augmented kernels that function as the shared set of kernels to be used in the convolutional phase by the common CNN layer 210, 212 to extract the feature maps 216, 218 for the respective CNN layer 210, 212.

In an exemplary embodiment, the if-else logic for implementing the kernel shortlisting criteria analyzes each element of the respective kernel matrix to determine whether the same (or substantially similar) feature value is retained across at least a threshold number of consecutive adjacent features in a linear or diagonal dimension, and when at least the threshold number of consecutive adjacent feature along that dimension have the same or substantially similar feature value (e.g., within some threshold amount or percentage), that feature value is retained for those features within the kernel matrix. For example, for a 3-by-3 kernel matrix, the kernel shortlisting criteria may require that the same (or similar) feature value be present in three consecutive locations, either horizontally, vertically or diagonally. Otherwise (or else), the value for a given of the kernel matrix is replaced with a zero value or a small constant de minimis value (e.g., to avoid vanishing gradient) to negate the influence of that feature within the kernel matrix. As a result, the augmented kernels have nonzero values that reflect horizontal, vertical, or diagonal features that facilitate learning generalized features of graphical layouts, symbology or other geometric or structural graphical components, while other kernels that lack horizontal, vertical or diagonal features will be rendered non-contributing kernels by substituting zero or another small value at the feature locations within the respective kernel matrices. In other words, the augmented kernels emphasize identifiable feature patterns within a respective kernel while deemphasizing variable or non-pattern features. The resulting shared set of augmented kernels are then utilized by the respective CNN layer 210, 212 to extract the feature map 216, 218 associated with that respective CNN layer 210, 212.

After extracting feature maps for each of the CNN layers using shared sets of augmented kernels for the respective CNN layers that were created using kernel shortlisting criteria, the image verification process 400 continues by calculating or otherwise determining feature difference vectors for each CNN layer based on the relationship between the extracted feature maps associated with the respective CNN layer and then calculating or otherwise determining a corresponding similarity score for the respective CNN layer based on the feature difference vector for the respective CNN layer (tasks 412, 414). As described above, at the classification stage 219, 300, the absolute difference between extracted feature maps 216, 218 for a given layer of the CNN layers 210, 212 is calculated by the feature vector difference determination process 220, 306, 316, 326 associated with the respective CNN layer, with the feature vector difference being input or otherwise provided to a sigmoid function or other nonlinear activation function 222, 308, 318, 328 before computing a layer-wise similarity score for that respective CNN layer as a function of the resulting vector, as described above in the context of the similarity score determination processes 310, 320, 330.

After determining the similarity score for the different CNN layers in the Siamese network configuration, the image verification process 400 calculates or otherwise determines a joint similarity score across all layers of the CNN as a weighed function of the layer-wise similarity scores using optimized weighting factors associated with the respective CNN layers (task 416). As described above in the context of the joint similarity score determination process 340, the similarity score determination process 224 calculates the joint similarity score as a weighted sum of the similarity scores associated with the individual constituent CNN layers 210, 212 using the respective layer weighting factor 226 associated with the respective CNN layer 210, 212. The image verification process 400 then validates the unverified input image based on the joint similarity score (task 418). In this regard, when the joint similarity score is greater than a classification threshold value, the image verification service 124, 200 outputs or otherwise provides an indication that the unverified input image 112 passed the comparison or has otherwise been validated as matching the reference image, thereby verifying that the input image 112 includes the requisite symbology, graphical layout or other graphical components that are necessary in order to comply with applicable regulations, specifications or other requirements. On the other hand, when the joint similarity score is less than the classification threshold value, the image verification service 124, 200 outputs or otherwise provides an indication that the unverified input image 112 failed the comparison and cannot be validated as matching the reference image, thereby notifying the developer or other user that the display software 102 may not be ready for certification or deployment. For example, when the unverified image 112 fails the automated comparison, the developer or other user may manually compare the images 112, 114 to determine the cause or rationale for the failure or generate a report depicting the failure. In this regard, since the certification may require a certain level of accuracy or a certain result, a human user can review the images 112, 114 to identify the discrepancies or inconsistencies between images 112, 114 that triggered the automated verification failure to ascertain whether or not the differences between the images 112, 114 substantively impacts the certification of the display software 102. Thus, the image verification process 400 may be utilized to automatically validate or verify numerous different images 112 generated by the display software 102 to reduce the number of pairs of images 112, 114 requiring manual comparisons in order to certify the display software 102, thereby reducing the time to market.

Figure 5:
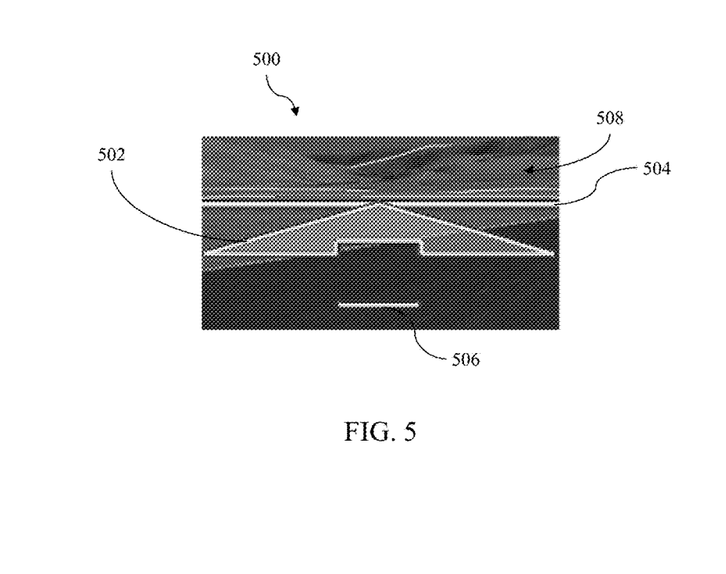
FIG. 5 depicts a captured image of a GUI display generated by uncertified software suitable for use with the image verification process of FIG. 4 in accordance with one or more exemplary embodiments.
Figure 6:
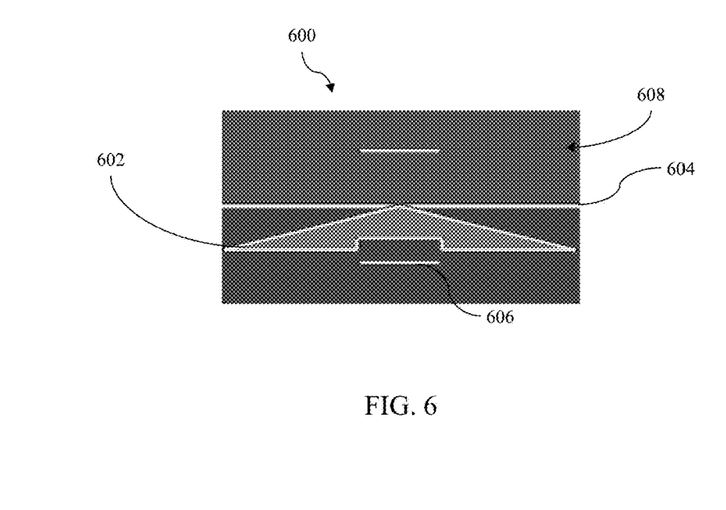
FIG. 6 depicts a reference image suitable for use with the image verification process of FIG. 4 to validate the captured image of FIG. 5 in accordance with one or more exemplary embodiments.

FIG. 5 depicts an exemplary unverified input image 500 and corresponding reference image 600 suitable for use with the image verification process 400 of FIG. 4 and the image verification service 124, 200 described above in the context of FIGS. 1-4. In this regard, the unverified image 500 to be tested is realized as a captured state of a SVS GUI display (after grayscale conversion and character removal) that includes a graphical representation of an ownship aircraft symbol 502 with respect to a graphical horizon indicator 504 and a graphical attitude indicator 506 overlying a graphical representation of terrain 508 corresponding to the current geographic location, heading, altitude and attitude of the ownship aircraft, while the reference image 600 is realized as a captured state of a PFD GUI display (after grayscale conversion and character removal) that includes a graphical representation of an ownship aircraft symbol 602 with respect to a graphical horizon indicator 604 and a graphical attitude indicator 606 overlying a bichromatic background 608. In this regard, the image verification process 400 described above allows the image verification service 124, 200 to verify that the graphical layout and symbology 502, 504, 506 contained within the captured image 500 of the SVS GUI display generated by the display software 102 under test matches the graphical layout and symbology 602, 604, 606 associated with the verified reference image 600 associated with certified display software for rendering the PFD GUI display even though the respective backgrounds 508, 608 are dissimilar. For example, by virtue of the kernel shortlisting criteria, kernels that could otherwise be attributable to the backgrounds 508, 608 may be rendered non-contributing by augmenting the pixel values to be equal to zero or substantially zero, at least at the lower CNN layers 210, 212, while kernels that would be attributable to the graphical layout and symbology 502, 504, 506, 602, 604, 606 that include consecutive pixel values having the same intensity in horizontal, vertical or diagonal dimensions may be shared across CNN layers 210, 212, thereby resulting in increased similarity of the extracted feature maps 216, 218 at the lower CNN layers 210, 212. Moreover, by virtue of the layer weighting factors 226 progressively decreasing towards the higher CNN layers 210, 212, any chromatic and geometric differences between the backgrounds 508, 608 that might otherwise be detectable at the higher CNN layers 210, 212 may be relatively deemphasized compared to the graphical features corresponding to the layout and symbology 502, 504, 506, 602, 604, 606.

Figure 7:
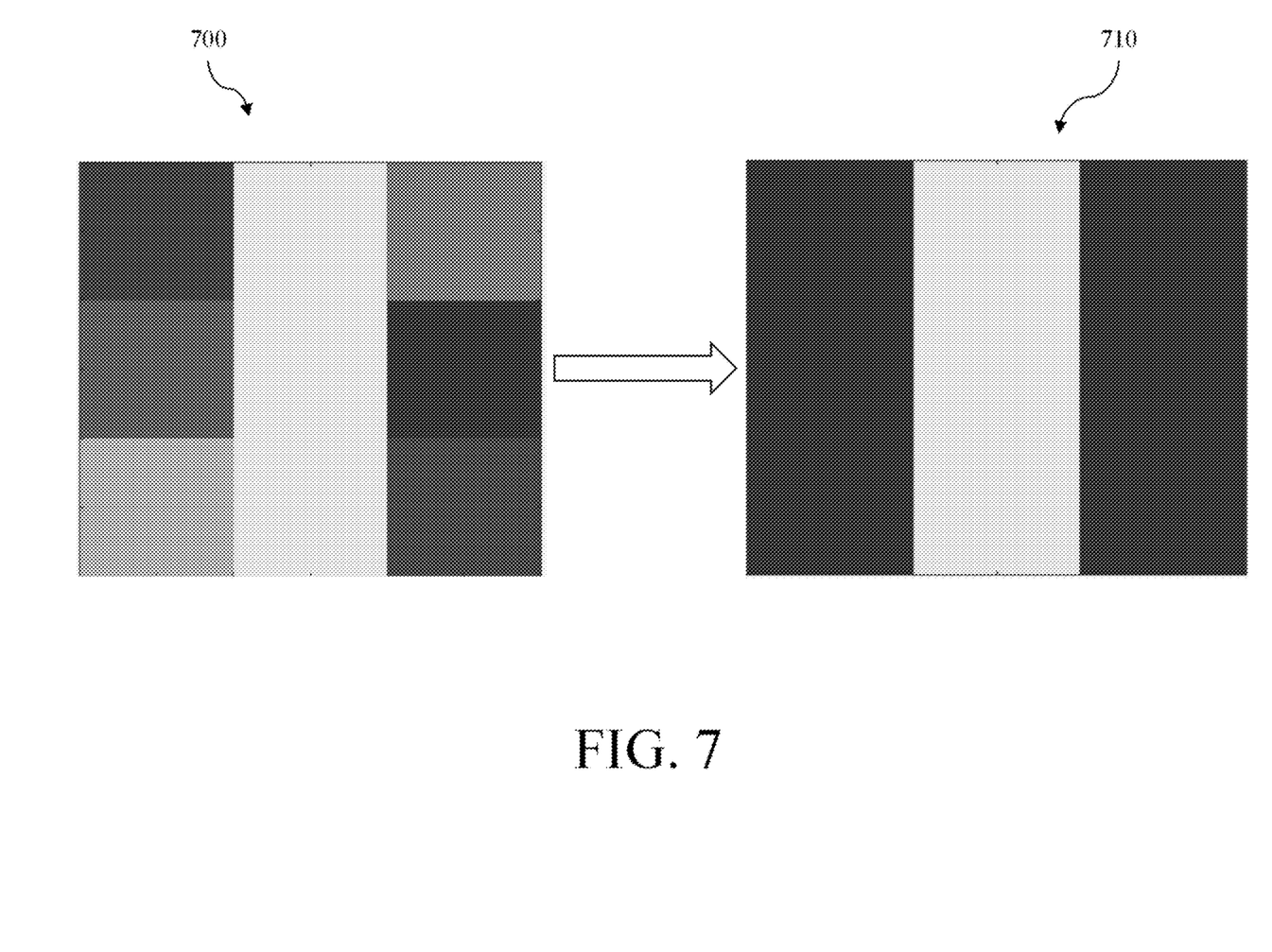
FIG. 7 depicts an exemplary relationship between an initially identified kernel and an augmented kernel using kernel shortlisting criteria suitable for use with the image verification process 400 of FIG. 4 in accordance with one or more exemplary embodiments.

FIG. 7 depicts an exemplary 3-by-3 kernel 700 that may be identified from an input image 112, 114 and a resulting augmented version of the kernel 710 that may be utilized as part of the shared set of kernels in accordance with the kernel shortlisting criteria as described above. In this regard, the initially identified kernel 700 corresponds to the following matrix of pixel values:

$$\begin{bmatrix} 0.16 & 0.9 & 0.35 \\ 0.23 & 0.9 & 0.12 \\ 0.67 & 0.9 & 0.18 \end{bmatrix}.$$

After identifying three consecutive adjacent pixels having the same value in the vertical dimension, those pixel values are retained as feature values to emphasize the identified feature pattern while the other locations are set to a feature value substantially equal to zero (e.g., 0.1) to deemphasize non-pattern features and render them non-contributing, resulting in the augmented kernel 710 corresponding to the following matrix of feature values:

$$\begin{bmatrix} 0.01 & 0.9 & 0.01 \\ 0.01 & 0.9 & 0.01 \\ 0.01 & 0.9 & 0.01 \end{bmatrix}.$$

The augmented kernel 710 is utilized in the shared set of kernels for a respective CNN layer 210, 212 to facilitate extracting vertical features from the respective input images 112, 114 in a manner that deemphasizes background pixels adjacent to the vertical feature, thereby improving the ability of the image verification process 400 to identify similar symbology or other graphical layout features including a vertical feature independent of any variable background across the images 112, 114. In other words, applying kernel shortlisting criteria to all kernels helps the learning-based model to develop a feature extraction layer which is sensitive to only key features of constant intensity levels and regular geometry, and suppresses learning from background terrain data. For example, the kernel shortlisting criteria can render non-contributing not only variable backgrounds but also regions of a GUI display or image where there is a high amount of instrument clutter or other overlying graphical objects that are not of interest for purposes of testing and verification. In this regard, kernel shortlisting can remove or reduce the pixel values of noncontributing objects of interest, thereby reducing the dissimilarities in comparison and improving accuracy of comparison of main objects of interest.

For the sake of brevity, conventional techniques related to graphical user interfaces, graphics and image processing, CNNs, artificial intelligence, avionics systems, software certification, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of automated validation of an unverified image, the method comprising:
analyzing the unverified image to identify a first plurality of kernels associated with a first layer of a convolutional neural network for the unverified image;
analyzing a reference image to identify a second plurality of kernels associated with the first layer of the convolutional neural network for the reference image;
creating a shared set of kernels associated with the first layer based at least in part on the first plurality of kernels and the second plurality of kernels in accordance with one or more kernel shortlisting criteria;
obtaining a first feature map for the first layer of the unverified image using the first layer of the convolutional neural network and the shared set of kernels;
obtaining a second feature map for the first layer of the reference image using the first layer of the convolutional neural network and the shared set of kernels;
calculating a similarity score for the unverified image based at least in part on differences between the first feature map and the second feature map and a weighting factor associated with the first layer; and
automatically validating the unverified image based at least in part on the similarity score.

2. The method of claim 1, further comprising:
analyzing the unverified image to identify a third plurality of kernels associated with a second layer of the convolutional neural network for the unverified image;
analyzing the reference image to identify a fourth plurality of kernels associated with the second layer of the convolutional neural network for the reference image;
creating a second shared set of kernels associated with the second layer based at least in part on the third plurality of kernels and the fourth plurality of kernels in accordance with the one or more kernel shortlisting criteria;
obtaining a third feature map for the second layer of the unverified image using the second layer of the convolutional neural network and the second shared set of kernels;
obtaining a fourth feature map for the second layer of the reference image using the second layer of the convolutional neural network and the second shared set of kernels; and
calculating a second similarity score for the unverified image based at least in part on differences between the third feature map and the fourth feature map, wherein:
calculating the similarity score comprises:
calculating a first similarity score based at least in part on differences between the first feature map and the second feature map; and
calculating a joint similarity score as a weighted sum of a first product of the first similarity score and the weighting factor and a second product of the second similarity score and a second weighting factor associated with the second layer; and automatically validating the unverified image comprises automatically validating the unverified image when the joint similarity score is greater than a classification threshold.

3. The method of claim 2, wherein the weighting factor associated with the first layer is greater than the second weighting factor associated with the second layer.

4. The method of claim 1, wherein automatically validating the unverified image comprises automatically tagging the unverified image with metadata indicating the unverified image is verified when the similarity score is greater than a threshold value.

5. The method of claim 1, wherein creating the shared set of kernels comprises for each kernel of the first plurality of kernels and the second plurality of kernels, for each location within the respective kernel, substituting a noncontributing value for the respective location when a number of consecutive adjacent locations having a substantially similar value is less than a threshold.

6. The method of claim 1, further comprising:
prior to analyzing the unverified image to identify the first plurality of kernels:
detecting one or more alphanumeric characters within the unverified image; and
removing the one or more alphanumeric characters from the unverified image.

7. The method of claim 6, wherein removing the one or more alphanumeric characters comprises, for each alphanumeric character of the one or more alphanumeric characters:
detecting a background color about the respective alphanumeric character; and
substituting the background color for pixels of the respective alphanumeric character.

8. The method of claim 1, wherein calculating the similarity score comprises determining a joint similarity score across layers of the convolutional neural network in a Siamese network configuration based at least in part on the differences between the first feature map and the second feature map and the weighting factor associated with the first layer.

9. The method of claim 1, further comprising:
augmenting a first subset of the first plurality of kernels to deemphasize nonpattern features within a respective kernel of the first plurality of kernels, resulting in a first augmented subset of kernels associated with the first layer of the convolutional neural network for the unverified image; and
augmenting a second subset of the second plurality of kernels to deemphasize nonpattern features within a respective kernel of the second plurality of kernels, resulting in a second augmented subset of kernels associated with the first layer of the convolutional neural network for the reference image, wherein creating the shared set of kernels comprises combining the first augmented subset of kernels and the second augmented subset of kernels to obtain the shared set of kernels.

10. A non-transitory computer-readable medium having computer-executable instructions stored thereon that, when executed by a processing system, cause the processing system to:
analyze an unverified image using a first layer of a convolutional neural network to identify a first plurality of kernels associated with the first layer of the convolutional neural network for the unverified image;
analyze a reference image using the first layer of the convolutional neural network to identify a second plurality of kernels associated with the first layer of the convolutional neural network for the reference image;
create a shared set of kernels associated with the first layer based at least in part on the first plurality of kernels and the second plurality of kernels in accordance with one or more kernel shortlisting criteria;
extract a first feature map for the first layer of the unverified image using the first layer of the convolutional neural network and the shared set of kernels;
extract a second feature map for the first layer of the reference image using the first layer of the convolutional neural network and the shared set of kernels;
calculate a similarity score for the unverified image based at least in part on differences between the first feature map and the second feature map and a weighting factor associated with the first layer; and
automatically validate the unverified image based at least in part on the similarity score.

11. The non-transitory computer-readable medium of claim 10, wherein the computer-executable instructions cause the processing system to:
analyze the unverified image to identify a third plurality of kernels associated with a second layer of the convolutional neural network for the unverified image;
analyze the reference image to identify a fourth plurality of kernels associated with the second layer of the convolutional neural network for the reference image;
create a second shared set of kernels associated with the second layer based at least in part on the third plurality of kernels and the fourth plurality of kernels in accordance with the one or more kernel shortlisting criteria;
extract a third feature map for the second layer of the unverified image using the second layer of the convolutional neural network and the second shared set of kernels;
extract a fourth feature map for the second layer of the reference image using the second layer of the convolutional neural network and the second shared set of kernels; and
calculate a second similarity score for the unverified image based at least in part on differences between the third feature map and the fourth feature map, wherein:
calculating the similarity score comprises:
calculating a first similarity score based at least in part on differences between the first feature map and the second feature map; and
calculating a joint similarity score as a weighted sum of a first product of the first similarity score and the weighting factor and a second product of the second similarity score and a second weighting factor associated with the second layer; and
automatically validating the unverified image comprises automatically validating the unverified image when the joint similarity score is greater than a classification threshold.

12. The on-transitory computer-readable medium of claim 11, wherein the weighting factor associated with the first layer is greater than the second weighting factor associated with the second layer.

13. The non-transitory computer-readable medium of claim 10, wherein the computer-executable instructions cause the processing system to automatically tag the unverified image with metadata indicating the unverified image is verified when the similarity score is greater than a threshold value.

14. The non-transitory computer-readable medium of claim 10, wherein the computer-executable instructions cause the processing system to create the shared set of kernels by, for each kernel of the first plurality of kernels and the second plurality of kernels, for each location within the respective kernel, substituting a noncontributing value for the respective location when a number of consecutive adjacent locations having a substantially similar value is less than a threshold.

15. The non-transitory computer-readable medium of claim 10, wherein the computer-executable instructions cause the processing system to detect one or more alphanumeric characters within the unverified image and remove the one or more alphanumeric characters from the unverified image prior to analyzing the unverified image to identify the first plurality of kernels.

16. The non-transitory computer-readable medium of claim 15, wherein the computer-executable instructions cause the processing system to remove the one or more alphanumeric characters by detecting a background color about a respective alphanumeric character and substituting the background color for pixels of the respective alphanumeric character.

17. The non-transitory computer-readable medium of claim 10, wherein the computer-executable instructions cause the processing system to calculate the similarity score by determining a joint similarity score across layers of the convolutional neural network in a Siamese network configuration based at least in part on the differences between the first feature map and the second feature map and the weighting factor associated with the first layer.

18. A computing device comprising:
   at least one computer-readable storage medium to store computer-executable instructions; and
   at least one processor, coupled to the at least one computer-readable storage medium, to execute the computer-executable instructions to:
      analyze an unverified image using a first layer of a convolutional neural network to identify a first plurality of kernels associated with the first layer of the convolutional neural network for the unverified image;
      analyze a reference image using the first layer of the convolutional neural network to identify a second plurality of kernels associated with the first layer of the convolutional neural network for the reference image;
      create a shared set of kernels associated with the first layer based at least in part on the first plurality of kernels and the second plurality of kernels in accordance with one or more kernel shortlisting criteria;
      extract a first feature map for the first layer of the unverified image using the first layer of the convolutional neural network and the shared set of kernels;
      extract a second feature map for the first layer of the reference image using the first layer of the convolutional neural network and the shared set of kernels;
      calculate a similarity score for the unverified image based at least in part on differences between the first feature map and the second feature map and a weighting factor associated with the first layer; and
      automatically validate the unverified image based at least in part on the similarity score.

19. The computing device of claim 18, wherein the computer-executable instructions cause the at least one processor to automatically tag the unverified image with metadata indicating the unverified image is verified when the similarity score is greater than a threshold value.

20. The computing device of claim 18, wherein the computer-executable instructions cause the at least one processor to detect one or more alphanumeric characters within the unverified image and remove the one or more alphanumeric characters from the unverified image prior to analyzing the unverified image to identify the first plurality of kernels.

* * * * *